(12) United States Patent
Motamed et al.

(10) Patent No.: US 7,884,962 B2
(45) Date of Patent: *Feb. 8, 2011

(54) SYSTEMS AND METHODS FOR MULTIPLE RASTER IMAGE PROCESSING

(75) Inventors: Margaret Motamed, Foster City, CA (US); Ravi Someshwar, Foster City, CA (US); Chew Yan Kong, Mountain View, CA (US); Ravindranath Gunturu, Newark, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 11/169,131

(22) Filed: Jun. 27, 2005

(65) Prior Publication Data

US 2005/0237571 A1    Oct. 27, 2005

Related U.S. Application Data

(63) Continuation of application No. 09/514,465, filed on Feb. 28, 2000, now Pat. No. 6,930,795, which is a continuation-in-part of application No. 09/298,639, filed on Apr. 23, 1999, now Pat. No. 6,327,050.

(60) Provisional application No. 60/098,125, filed on Aug. 27, 1998.

(51) Int. Cl.
    *G06F 15/00* (2006.01)
(52) U.S. Cl. .................. 358/1.18; 358/1.15; 715/209
(58) Field of Classification Search ............. 358/1.13, 358/296, 1.15, 1.9, 1.1, 401, 1.18, 1.16, 1.17; 395/114, 115, 101; 355/202; 703/21; 235/462.15; 370/220, 468; 715/209; 714/13; 399/83
See application file for complete search history.

(56) References Cited

U.S. PATENT DOCUMENTS

| 4,213,201 | A | * | 7/1980 | Gagnier et al. | ............ | 370/220 |
| 4,839,829 | A |   | 6/1989 | Freedman |  |  |
| 5,287,194 | A | * | 2/1994 | Lobiondo | ............ | 358/296 |
| 5,287,434 | A | * | 2/1994 | Bain et al. | ............ | 235/462.15 |
| 5,625,766 | A |   | 4/1997 | Kauffman |  |  |

(Continued)

FOREIGN PATENT DOCUMENTS

EP          0578258          1/1994

(Continued)

OTHER PUBLICATIONS

PCT/US1999/016112 Int'l Search Report from Related WO Case, Nov. 15, 1999, Motamed et al.

(Continued)

*Primary Examiner*—Edward L Coles
*Assistant Examiner*—Ashish K Thomas
(74) *Attorney, Agent, or Firm*—Glenn Patent Group; Michael A. Glenn

(57) ABSTRACT

Apparatus and methods for raster image processing are provided that include a networked computer coupled to a plurality of networked printers, the networked computer adapted to receive a print job, parse the print job into one or more print pieces, load balance the print pieces among the printers based on color use and print speed, and provide a list of the printers that received the print pieces.

14 Claims, 3 Drawing Sheets

U.S. PATENT DOCUMENTS

| | | | |
|---|---|---|---|
| 5,652,711 A | | 7/1997 | Vennekens |
| 5,713,032 A | * | 1/1998 | Spencer ..................... 715/209 |
| 5,859,711 A | * | 1/1999 | Barry et al. ................. 358/296 |
| 5,978,559 A | * | 11/1999 | Quinion ..................... 358/1.15 |
| 5,978,560 A | * | 11/1999 | Tan et al. ................... 358/1.15 |
| 5,995,723 A | * | 11/1999 | Sperry et al. ............... 358/1.15 |
| 6,049,390 A | | 4/2000 | Notredame et al. |
| 6,097,503 A | * | 8/2000 | Felleman .................... 358/1.9 |
| 6,229,622 B1 | | 5/2001 | Takeda |
| 6,295,133 B1 | * | 9/2001 | Bloomquist et al. .......... 358/1.1 |
| 6,311,149 B1 | * | 10/2001 | Ryan et al. .................... 703/21 |
| 6,327,050 B1 | | 12/2001 | Motamed et al. |
| 6,411,396 B1 | | 6/2002 | Benson et al. |
| 6,441,920 B1 | | 8/2002 | Smith |
| 6,559,966 B1 | | 5/2003 | Laverty et al. |
| 2002/0063877 A1 | * | 5/2002 | Lucivero et al. ........... 358/1.13 |
| 2003/0011805 A1 | * | 1/2003 | Yacoub ..................... 358/1.15 |

FOREIGN PATENT DOCUMENTS

| | | |
|---|---|---|
| EP | 0545261 | 4/1997 |
| EP | 0917044 | 5/1999 |
| WO | WO 96/01449 | 1/1996 |
| WO | WO 97/06481 | 2/1997 |

OTHER PUBLICATIONS

PCT/US1999/016112 Int'l Prelim Exam Report from Related WO Case, Feb. 12, 2001, Motamed et al.

PCT/US2001/01402 Int'l Search Report from Related WO Case, Jan. 31, 2002, Motamed et al.

PCT/US2001/01402 Int'l Prelim Exam Report from Related WO Case, Apr. 21, 2003, Motamed et al.

EP 99935626.4 Examination Report from Related EPO Case, Aug. 29, 2003, Motamed et al.

AU 2001236467 Examination Report from Related AU Case, Oct. 28, 2004, Motamed et al.

EP 99935626.4 Examination Report from Related EPO Case, Nov. 5, 2004, Motamed et al.

EP 01908619.8 Examination Report from Related EPO Case, Jan. 19, 2006, Motamed et al.

EP 01908619.8 Examination Report from Related EPO Case, Feb. 28, 2007, Motamed et al.

* cited by examiner

SYSTEMS AND METHODS FOR MULTIPLE RASTER IMAGE PROCESSING

REFERENCE TO RELATED APPLICATIONS

This application is a continuation of U.S. application Ser. No. 09/514,465, filed 28 Feb. 2000, now U.S. Pat. No. 6,930,795, which is a continuation-in-part of U.S. application Ser. No. 09/298,639, filed 23 Apr. 1999, now U.S. Pat. No. 6,327,050, which claims the benefit of U.S. provisional application Ser. No. 60/098,125, filed 27 Aug. 1998.

BACKGROUND

The invention relates to the printing of images, which exist in a digital electronic format. More particularly, the invention relates to a printing method and apparatus that supports automatic print loading, cluster printing, and other optional components.

Every image that exists in a digital electronic format is made of picture elements. At some point, all such digital image data, whether expressed as vector format data or bitmap format data, must be rendered into pixels for display on a monitor or for printing on a printer. All images, therefore, have pixels as their base. Rendering, or translating the digital data into physical output, is the most important part of realizing such images. The term raster image processing ("RIP") refers to the process of translating digital image data into physical visual images and graphics. FIG. 1 is a block schematic diagram showing a conventional raster imaging processor in which raster images are images composed of lines of pixels. In raster image processing, each horizontal line of bitmap image pixel information is referred to as a scan line or raster line. In FIG. 1, Postscript® lines 10 and/or digital RGB or CMYK pixels 12 are shown processed by associated RIPs 13-15 to produce information that results in a physical output 16.

The simplest output devices translate only one raster line at a time and then output that line to film, paper, or a monitor. FIG. 2 is an illustration of an image 20 and a single raster line 22 as processed by such device. More efficient RIP techniques analyze an image all at one time and convert the image information into visual output.

The RIP is a program that may be embedded in hardware or the may exist entirely in software. A hardware RIP is a computer which is attached to an output device and which is dedicated to translating digital image data for output. Image data is sent from a workstation to a computer that is attached to the output device. The hardware RIP program which resides in this computer interprets the image data and provides raw on/off instructions to the output device. The actual interpreter may be any program that translates image information in accordance with a known format. For example, the Postscript® interpreter manufactured by Adobe Corporation of Mountain View, Calif. is commonly used in raster image processing.

A software RIP performs many of the same functions as a hardware RIP. The software RIP is usually located at a workstation that is not necessarily dedicated solely to the RIP function. The software RIP interprets the digital image data and produces therefrom information that is required for the output device to function properly. A major disadvantage of software RIPs is that the workstation may not be configured to perform at speeds equal to a dedicated hardware RIP. Software RIPs are also presently less desirable for larger print facilities because such RIPs usually require a large amount of free hard disk space on the workstation. Such hard disk storage is necessary because all of the digital data that are processed must be saved before they are sent to the output device.

The RIPing process is complex and much of the output device rating is based upon the device's image processing speed. The speed of the interpreter or RIP is a major factor in the efficiency of the entire image reproduction process. Because of the dedicated computer, hardware RIPs are typically faster than software RIPs. Even so, it would be advantageous to provide improvements in RIP architectures that increase processing speed and efficiency.

SUMMARY

This invention provides a networked printing system including a computer workstation coupled to a plurality of networked printers, the computer workstation adapted to receive a print job, parse the print job into a plurality of print pieces, load balance the print pieces among the printers based on color use and print speed and provide a list of the printers that received the print pieces. The invention also comprises an automatic print load-balancing component in a centralized or distributed raster image processing printing environment that enables faster system performance over single or multiple processors.

The invention comprises the following features:

Routes jobs to the most available printer based on color use, pages per minute, number of pages per said job, size, and number of copies for jobs already in a queue and number of copies of the job sent.

Automatically can split job copies across specified number of printers meeting job criteria.

Automatically can split a single copy that is a long job across more than one printer.

Supports mixed groups of printers, wherein they do not all need to be the same make and model.

Monitors the print job status and can redirect the job if an error occurs.

Supports job scheduling by allow a user to specify job priority, with password required for rush jobs, and to specify job rip and print scheduling in advance.

Supports specified non-proprietary black and white printers.

Other aspects and advantages of the invention will become apparent from the following detailed description in combination with the accompanying drawings, illustrating, by way of example, the principles of the invention.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

Figure 1:
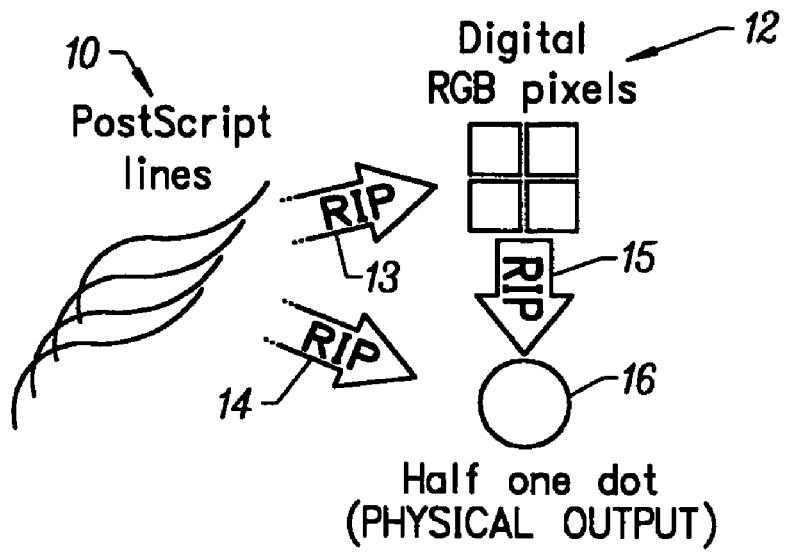
FIG. 1 is a block schematic diagram of a conventional raster image processing system.
Figure 2:
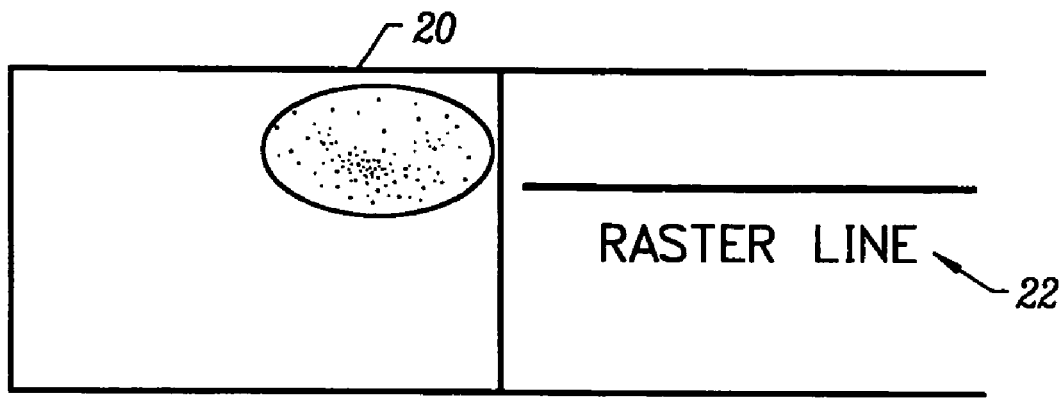
FIG. 2 is a drawing which illustrates the processing of a single raster image line.

The invention claimed herein provides a printing method and apparatus, comprising a software application that works with proprietary printing utilities, and that may include one or more additional software components for adding additional printing technology. The invention also comprises an automatic print load-balancing component in a centralized or distributed raster image processing printing environment that enables faster system performance over single or multiple processors.

When the claimed software application is linked to and ships with one or more additional printing software components, the collection can be viewed as a suite. The claimed invention operates in a distributed RIP environment, as well as a centralized RIP environment.

The preferred embodiment comprises, but is absolutely not limited to, the following features:

Load-Balancer: Automatic routing of jobs to the most available printer based on factors, such as, for example, color or black and white, pages per minute rates, the number of pages in a job, size of job, and copies for both the jobs already queued to print and the job to be sent. The decision is made to minimize the time to completely print out the job;

Load-Balancer: Automatic splitting of sets across more than one engine (e.g., copies 1-10 go to a first engine, and copies 11-20 go to a second engine). The goal is to route the job such that it will complete printing as soon as possible;

Load-Balancer: Automatic splitting of a single, long job, copy across more than one engine. The goal is to route the job such that it will complete printing as soon as possible;

Redirect On Error: Automatic redirection of a print job when a printer error occurs;

Job Scheduling: Specify job priority and time; and

Support for specified non-proprietary black and white printers, as well as support for mixed groups of printers, wherein they do not all need to be the same make and model.

The preferred embodiment is designed for high-volume corporate, CRD, and print-for-pay environments. In corporate environments, a proprietary linkable utility reports back the job status and printer choices, and in CRD and print-for-pay environments, another proprietary linkable utility provides a comprehensive view of printer and job status.

The preferred embodiment allows an administrator to designate a group of printers that can be used for hybrid printing (color and B&W), job load-balancing (1 copy, long job), or set load-balancing (many copies). The invention appears as a printer on a user's network and has a specific driver and PostScript Printer Description ("PPD") file associated with it. From the user's perspective, printing to the preferred embodiment load-balancing printer follows the same process as printing to any other printer on a network.

When the claimed application software starts, it advertises itself as a virtual printer on the network. When a user prints to the virtual printer from their workstation, the job is printed to the claimed application software. During the decision phase, the claimed invention determines an optimum printer choice(s) and forwards the job accordingly. The preferred embodiment reports engine choices back to the user via the two proprietary print utilities mentioned herein above.

Figure 3:
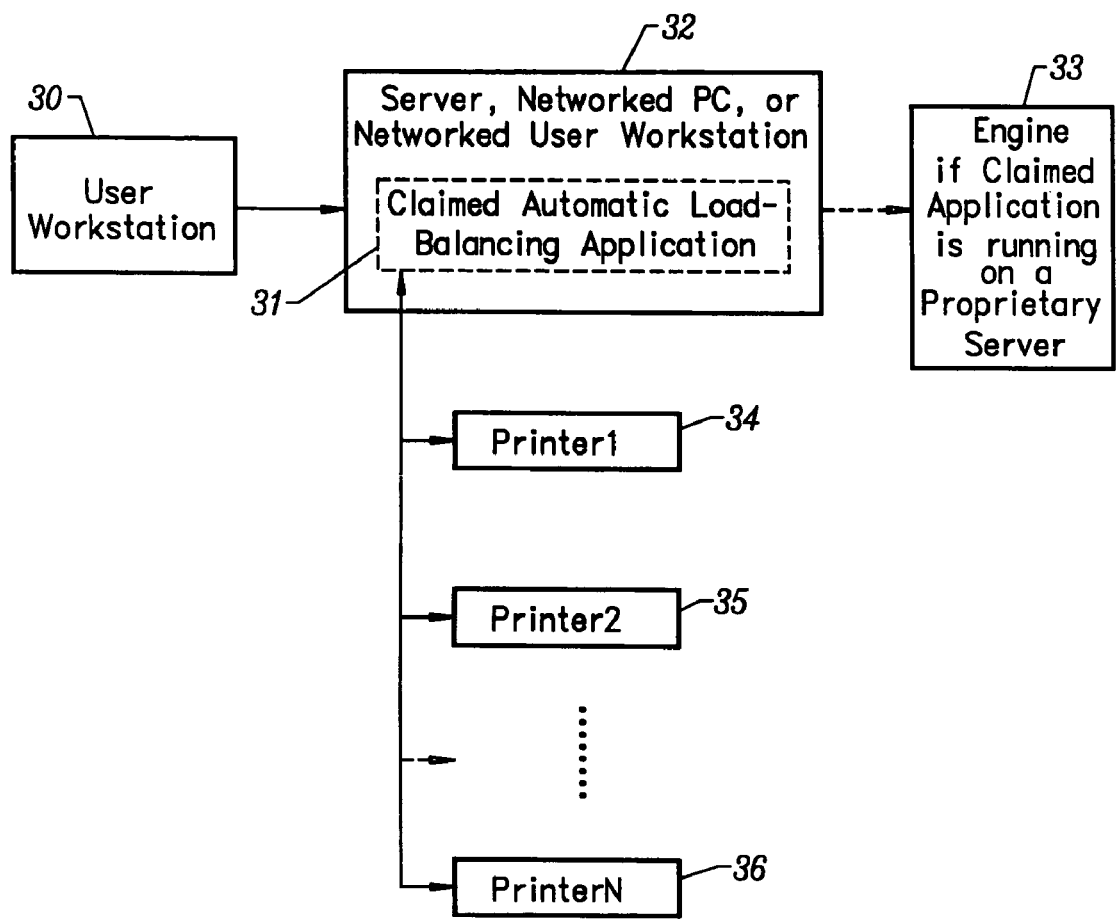
FIG. 3 is a block schematic diagram of the components of a preferred embodiment according to the invention.

FIG. 3 displays a path a print job takes from a user's workstation 30 to a final printing on a network connected engine according to the preferred embodiment of the invention. The workflow from the user perspective is fairly simple. The user sets appropriate PPD options for a print job using a proprietary driver utility 30. To print using the claimed invention, the user selects the virtual printer application 31 from their application. The virtual printer 31 resides on a server, networked PC, or networked user workstation 32. In an optional embodiment, if the claimed application resides on a proprietary server, then the job gets sent to a proprietary engine 33.

Once the print job has been sent to the claimed application 31, the preferred embodiment of the invention makes all load-balancing decisions and sends the job on to the appropriate server/engines for printing 61-63. Once the job has been sent out by the claimed application, the user determines to which server(s)/engine(s) their job has been sent using proprietary utilities. If an error occurs that requires the job to be redirected according to the error protocol of the preferred embodiment, the proprietary utilities reflect the server/engine changes to the user.

Figure 4:
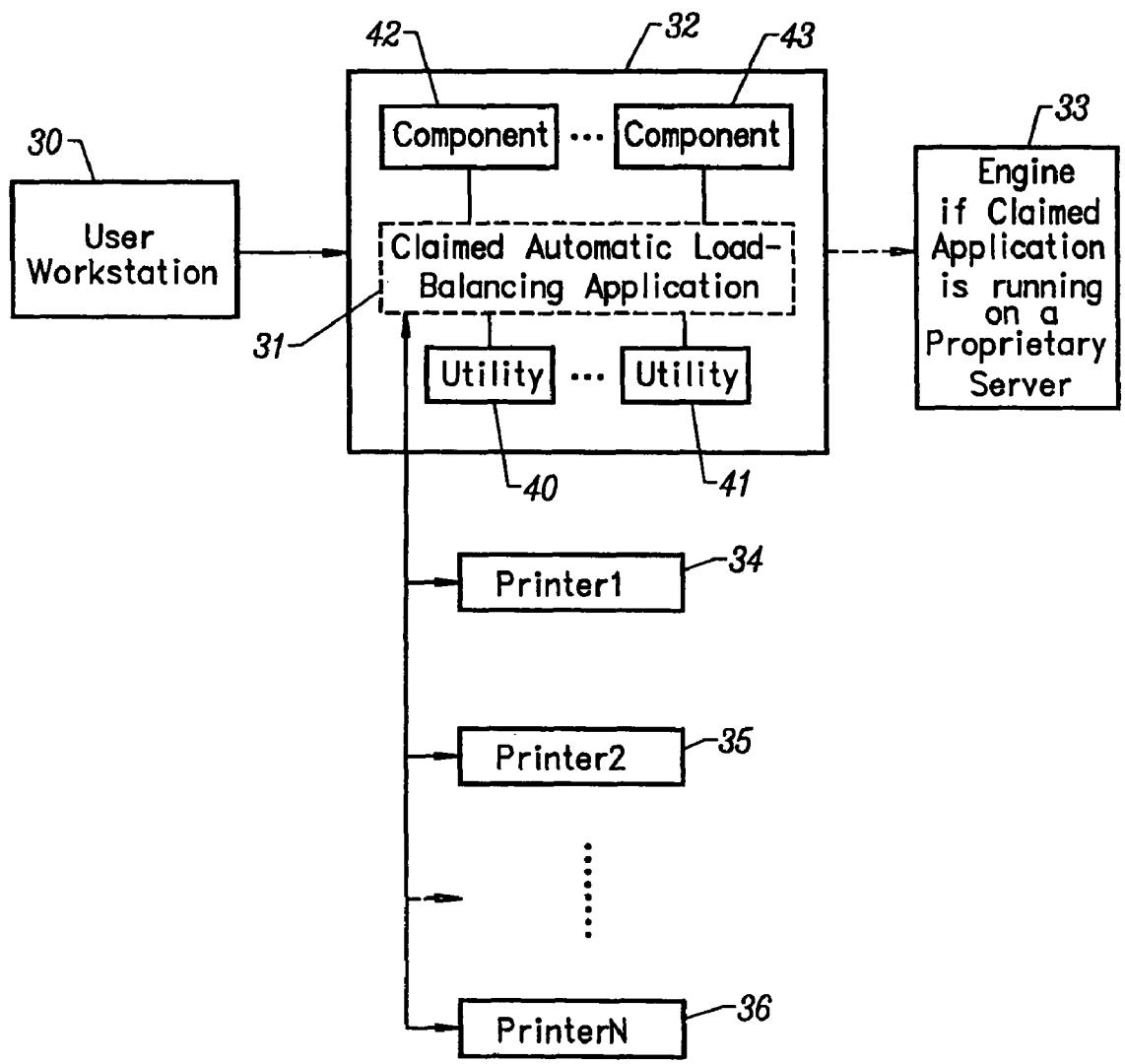
FIG. 4 is a block schematic diagram of the components of a preferred embodiment according to the invention.

FIG. 4 is a block schematic diagram of the components of a preferred embodiment according to the invention, similar to FIG. 3. The claimed application 31 is linked to proprietary utilities 40-41, and linked to component printer software 42-43 to allow some or all of the load-balancing.

In the preferred embodiment, proprietary utilities log into the application in an identical manner to logging into the proprietary server. Jobs sent to the application are displayed in a utility's active jobs sections queue. The application is responsible for listing printers the state of and where the pieces of a load-balanced print job has been sent. Also, the utility's menu setup option allows an administrator to access the application's setup interface.

In the preferred embodiment, job logs for the claimed invention and proprietary servers are displayed through the utilities. For each claimed automatic load-balanced job, the job log lists the job and all printers that received pieces of the job. For each proprietary server included in the automatic load-balancing group, the job log lists only the piece of the job that was sent to that server.

In the preferred embodiment, a proprietary driver lists all PPD options that can be set on the claimed application. Changes made to PPD options through the driver are applied on a per-job basis.

Functional Requirements

In the preferred embodiment, PPD options that are specific to the claimed application are all detected by the driver utility. The preferred embodiment comprises, but is not limited to the following PPD options.

Print Settings.

Selections comprise, but are not limited to:

Rush jobs which causes job to be printed as fast as possible, even if the engines in the group do not necessarily support all selected PPD options. A message dialog can appear informing the user of which PPD options are not supported.

Exact Match causes jobs only to be sent to engines within the selected group supporting the selected finishing equipment, including, for example, color vs. black & white, paper size, and the like. The user is informed if no match is made and reports the specific PPD choices that are not supported in the printer pool. A default PPD option is available.

Copy Split.

If print job contains multiple copies, indicates whether to split the number of copies over a number of engines, or simply to print all copies on one engine. The PPD option is related to the Maximum Number Of Engines Per Job PPD option herein below. Selections comprise, but are not limited to:

Yes. Splits copies across engines. Causes the set of copies to be split and printed across all of the engines included in a selected printer group. Limits the set split to the number of printers specified in Maximum Number Of Engines Per Job PPD Option.

No. Causes all copies in the set to be printed to a single engine from a selected printer group. Default PPD setting. Default goal is to find the particular engine that prints the job the fastest.

Long Job Split.

If print job consists of one copy of a file, indicates whether the file should be split to print across a number of engines, or simply to print all copies to one engine. Related to the Maximum Number of Engines Per Job PPD options. Selections comprise, but are not limited to:

No. Prints a long job on one engine. Causes the entire file to be printed from a single engine regardless of page length. Default PPD setting. Default goal is to find the one engine that will print the job the fastest.

Yes. Split long job across engines. If a file is greater than or equal to the number of pages set in application's setup, then the file is split up and printed among the different engines in the selected printer group. Restricted to the value set in the Maximum Number of Engines Per Job PPD.

Long Job Page Split Minimum.

The Long Job Page Split Minimum field determines how long a single job must be before the application will split the single job. This value only applies to long jobs that have been printed as a single copy. The default value is 200. It is noted that Page Split Minimum is a claimed application setup option, not a PPD option.

Maximum Number of Engines Per Job.

Maximum number of engines/printers over which a job can be load-balanced comprise, but are not limited to: 2, 3, 4, . . . , 24. PPD option applies to Set Split and Long Job Split PPD options cited herein above.

Reroute on Error.

Yes. Allows an administrator to specify to automatically re-route a print job when an engine error based on Error Recovery Timeout described herein below occurs.

No.

Error Recovery Timeout.

Error Recovery Timeout is related to Reroute On Error PPD option described herein above. A timeout period is set in the claimed application and is used when an engine failure such as, for example, a paper jam error, out of paper error, and the like occurs. The purpose of the timeout period is to cause the claimed application to wait a period of time specified by the administrator before redirecting a job to another load-balanced printer. The timeout period allows the engine operator time to correct the error condition before the job is redirected. It is noted that the Error Recovery Timeout is an application setup option, not a PPD option.

Priority.

Normal. A job is RIPed and printed in the order received. Default PPD setting.

Fastest. A job is moved to the front of a load-balancing queue for processing. Fastest priority requires an administrator password to be entered.

Background. A job always lets other jobs move ahead of it in the queue (nice mode), and is only processed in deadtime (background), or when no other jobs are waiting.

Job Scheduling.

The Job Schedule PPD allows a user to set a time and date that the job gets printed. The claimed application holds the print job until it is time to print. At that time, the job is inserted into a load-balance queue according to its priority described herein above.

Application Error Recovery.

In the preferred embodiment, and for proprietary servers loaded with the correct system software, errors detected on the claimed application jobs are passed back from the proprietary server to the claimed application. The error protocol is as follows:

Error Types

Engine problem. Engine problem comprises, but is not limited to paper jams, out of toner, out of paper, or any engine error code requiring attention. Engine problems are redirected according to the Error Protocol described herein below after Error Recovery Timeout has expired.

RIP related error.

Error Protocol.

Every time a claimed application's sent job's status changes within a proprietary server, the proprietary server sends the status to the claimed application. If a job's status is equal to Error as described herein above, the following steps apply:

1. The claimed application cancels the job on the printer.
2. The claimed application excludes problem printer/engine from the list of available resources.
3. The claimed application redirects print job to a new printer from the selected group.
4. If claimed application is unable to redirect the job because the printer group contains only one engine, or because no other engines meet job's requirements, the job is canceled and the user is notified.

Error redirections are given priority. The claimed application completes load-balancing the current job and redirects the problem job before moving to the next job in its queue. The claimed application can further split a set load-balanced job (multiple copies) during redirection, but does not split a job load-balanced (1 copy long job) during redirection.

Application Workflow.

In the preferred embodiment, the workflow from the user perspective is fairly simple. The claimed application is set up on a user's workstation in the same manner that a proprietary server is set up on the user's workstation. The user sets the appropriate PPD options as described herein above for the job using the driver utility as described herein above. To print to the claimed application, the user selects the virtual printer associated with the claimed application from their application.

Once the print job is sent to the claimed application, the claimed application makes all load-balancing decisions and sends the job on to the appropriate server/engines for printing. Once the job is sent out by the claimed application, the user determines to which server(s)/engine(s) the job is sent by using a proprietary utility(s).

If an error occurs the job is required to be redirected according to the error protocol described herein above, and the proprietary utility(s) reflects the server(s)/engine(s) changes to the user.

Job Flow.

In a preferred embodiment, the claimed application software is installed on a networked PC, which meets appropriate system requirements. When the claimed application is selected as the printer, a file is sent to the claimed application. The claimed application has a filter which parses the file. According to certain settings in the job PPD, then associated decisions are made during parsing. After optimum print job balancing is determined, the job is forwarded over the network to the designated Installation and Setup In the preferred embodiment, the claimed application software confirms that the assigned proprietary printers are the correct engine and revision. Administrative setup options are a part of the claimed application software.

Information required for setting up the claimed application for automatic load-balancing in a preferred embodiment are:
  IP Addresses for Engines 1 thru N (FIG. 3, 34-36).
  Device type for attached proprietary servers.
  Optional external collator software.
  Optional external scanner setup.
  Claimed application printer groups setup.
  Job ticket defaults.
  Error Recovery Timeout.

At installation, the claimed application in the preferred embodiment is placed in the networked PC or proprietary server's start-up group. The claimed application starts up when the PC or proprietary server is booted.

The foregoing merely illustrates the principles of this invention, and various modifications can be made by persons of ordinary skill in the art without departing from the scope and spirit of this invention.

The invention claimed is:

1. A raster image processing system comprising a networked computer coupled to one or more networked printers configured as a virtual printer group, the one or more networked printers comprising a PostScript Printer Description (PPD) file, a driver, at least one color printer, and at least one black-and-white printer, the networked computer adapted to: present a user with PPD options for one or more print jobs, wherein at least one of the one or more print jobs comprise at least one additional copy of a print job; receive the one or more print jobs and the PPD files comprising the PPD print options for the one or more print jobs; parse the one or more print jobs with a filter into a plurality of print pieces; load balance the print pieces between the at least one color printer and the at least one black-and-white printer based on a color usage of said one or more print jobs and a print speed of said one or more print jobs; schedule the one or more print jobs based on a printing priority rule for each print job, wherein the priority rule is selected from among a group of priority rules consisting of: normal priority, wherein normal priority comprises a default priority rule, and wherein print jobs having normal priority are printed in the order received; fastest priority, wherein print jobs having fastest priority are moved to the front of a load-balancing queue for print processing, and wherein said fastest priority requires an administrator password to be entered; and background priority, wherein print jobs having background priority always lets other jobs move ahead of it in the queue, and wherein print jobs having background priority are processed when no other jobs are waiting; print the one or more print jobs on the virtual printer group even if the printers in the virtual printer group do not support the selected PPD print options; monitor the status of each of the one or more print jobs; provide to a user a list of the printers and a status for each printer that received the print pieces, the status including an error; institute an error recovery timeout in response to any printer experiencing a printer error after receiving a print piece; and redirect the print job if the error recovery timeout expires according to an error protocol, wherein the error protocol comprises: cancelling the job on the problem printer; excluding the problem printer from the one or more networked printers; redirecting the job to another printer from the one or more networked printers; and cancelling the job if the one or more networked printers comprises a single printer and the single printer is the problem printer.

2. The system of claim 1, wherein the networked computer is further adapted to allow a user to designate a group of printers that can be used for hybrid printing, job load balancing, or set load balancing.

3. The system of claim 1, wherein the networked computer comprises an error protocol.

4. The system of claim 1, wherein the PPD print options comprise any of print settings, copy split, long job split, long job page split minimum, maximum number of engine per job, reroute on error, priority, job scheduling, and application error recovery.

5. The system of claim 1, wherein if any printer is used that does not support the selected PPD print options, the networked computer generates a message dialog to inform the user which PPD options are not supported.

6. The system of claim 1, wherein any piece of the print job that is redirected receives a priority.

7. The system of claim 1, wherein the error comprises any of a printer engine problem, an RIP related error, and an error protocol.

8. The system of claim 1, wherein the error is a printer engine problem comprising any of paper jam, out of toner, out of paper, or any engine error code that requires attention.

9. A networked printing system comprising a computer workstation coupled to one or more networked printers configured as a virtual printer group, the one or more networked printers comprising a PostScript Printer Description (PPD) file, a driver, at least one color printer, and at least one black-and-white printer, the computer workstation adapted to: present a user with PPD options for one or more print jobs, wherein at least one of the one or more print jobs comprise at least one additional copy of a print job; receive the one or more print jobs and the PPD files comprising the PPD print options for the one or more print jobs; parse the one or more print jobs into a plurality of print pieces; load balance the print pieces between the at least one color printer and the at least one black-and-white printers based on a color usage of said one or more print jobs and a print speed of said one or more print jobs; schedule the one or more print jobs based on a printing priority rule for each print job, wherein the priority rule is selected from among a group of priority rules consisting of: normal priority, wherein normal priority comprises a default priority rule, and wherein print jobs having normal priority are printed in the order received; fastest priority, wherein print jobs having fastest priority are moved to the front of a load-balancing queue for print processing, and wherein said fastest priority requires an administrator password to be entered; and background priority, wherein print jobs having background priority always lets other jobs move ahead of it in the queue, and wherein print jobs having background priority are processed when no other jobs are waiting; print the one or more print jobs on the virtual printer group even if the printers in the virtual printer group do not support the selected PPD print options; monitor the status of each of the one or more print jobs; provide to a user a list of the printers and a status for each printer that received the print pieces, the status including an error; institute an error recovery timeout in response to any printer experiencing a printer error after receiving a print piece; and redirect the print job if the error recovery timeout expires according to an error protocol, wherein the error protocol comprises: cancelling the job on the problem printer; excluding the problem printer from the one or more networked printers; redirecting the job to another printer from the one or more networked printers; and cancelling the job if the one or more networked printers comprises a single printer and the single printer is the problem printer.

10. The networked printing system of claim 9, wherein the computer workstation is further adapted to allow a user to designate a group of printers that can be used for hybrid printing, job load balancing, or set load balancing.

11. The networked printing system of claim 7, wherein the computer workstation comprises an error protocol.

12. A computer program product for raster image processing, stored in a non-transitory computer-readable medium, that executes the following steps: presenting a user with PPD options for one or more print jobs wherein at least one of the one or more print jobs comprise at least one additional copy of a print job; receiving the one or more print jobs and the PPD files comprising the PPD print options for the one or more print jobs; parsing the one or more print jobs with a filter into a plurality of print pieces; load balancing the print pieces between the at least one color printer and the at least one black-and-white printer based on a color usage of said one or more print jobs and a print speed of said one or more print jobs; scheduling the one or more print jobs based on a printing priority rule for each print job, wherein the priority rule is selected from among a group of priority rules consisting of: normal priority, wherein normal priority comprises a default priority rule, and wherein print jobs having normal priority are printed in the order received; fastest priority, wherein print jobs having fastest priority are moved to the front of a load-balancing queue for print processing, and wherein said fastest priority requires an administrator password to be entered; and background priority, wherein print jobs having background priority always lets other jobs move ahead of it in the queue, and wherein print jobs having background priority are processed when no other jobs are waiting; printing the one or more print jobs on the virtual printer group even if the printers in the virtual printer group do not support the selected PPD print options; monitoring the status of each of the one or more print jobs; providing a list of the printers and a status for each printer that received the print pieces, the status including an error; instituting an error recovery timeout in response to any printer experiencing a printer error after receiving a print piece; and redirecting the print job if the error recovery timeout expires according to an error protocol, wherein the error protocol comprises: cancelling the job on the problem printer; excluding the problem printer from the one or more networked printers; redirecting the job to another printer from the one or more networked printers; and cancelling the job if the one or more networked printers comprises a single printer and the single printer is the problem printer.

13. The computer program product of claim 12, wherein if any printer is used that does not support the selected PPD print options, the networked computer generates a message dialog to inform the user which PPD options are not supported.

14. computer program product of claim 12, wherein any piece of the print job that is redirected receives a priority.

* * * * *